United States Patent
Bright-Thomas

(10) Patent No.: US 9,369,668 B2
(45) Date of Patent: Jun. 14, 2016

(54) ELEMENTARY VIDEO BITSTREAM ANALYSIS

(71) Applicant: Cisco Technology, Inc., San Jose, CA (US)

(72) Inventor: Paul G. Bright-Thomas, Wokingham (GB)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 14/211,700

(22) Filed: Mar. 14, 2014

(65) Prior Publication Data

US 2015/0264313 A1    Sep. 17, 2015

(51) Int. Cl.
| | |
|---|---|
| *H04N 7/14* | (2006.01) |
| *H04N 7/15* | (2006.01) |
| *G06K 9/46* | (2006.01) |
| *G06T 7/20* | (2006.01) |

(52) U.S. Cl.
CPC .. *H04N 7/15* (2013.01); *G06K 9/46* (2013.01); *G06K 9/4604* (2013.01); *G06T 7/20* (2013.01); *H04N 7/152* (2013.01)

(58) Field of Classification Search
CPC ........... G06K 9/46; G06K 9/4604; G06T 7/20
USPC ................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 6,297,846 B1 * | 10/2001 | Edanami ................... | 348/239 |
| 6,344,930 B1 * | 2/2002 | Kaneko et al. ............ | 359/666 |
| 6,466,624 B1 * | 10/2002 | Fogg ........................ | 375/240.27 |
| 6,711,212 B1 | 3/2004 | Lin | |
| 7,113,200 B2 * | 9/2006 | Eshkoli ..................... | 348/14.07 |
| 7,447,266 B2 * | 11/2008 | Yamashita et al. ........ | 375/240.25 |
| 8,384,754 B2 * | 2/2013 | Goodman ................ | 348/14.01 |
| 8,743,955 B2 * | 6/2014 | Kim et al. ................. | 375/240.1 |
| 8,780,970 B2 * | 7/2014 | Horowitz ................. | 375/240 |
| 8,885,727 B2 * | 11/2014 | Lee et al. ................. | 375/240.24 |
| 2002/0025000 A1 * | 2/2002 | Takeuchi et al. ........ | 375/240.12 |
| 2003/0112866 A1 | 6/2003 | Yu et al. | |
| 2003/0151062 A1 * | 8/2003 | Cho .......................... | 257/185 |
| 2005/0281289 A1 * | 12/2005 | Huang et al. ............. | 370/484 |
| 2006/0210175 A1 | 9/2006 | Huang et al. | |
| 2006/0215765 A1 | 9/2006 | Hwang et al. | |

(Continued)

FOREIGN PATENT DOCUMENTS

WO    0163937 A2    8/2001

OTHER PUBLICATIONS

Meng et al., "Scene Change Detection in a MPEG Compressed Video Sequence", IS&T/SPIE Symposium Proceedings vol. 2419, Feb. 1995, 12 pages.

(Continued)

*Primary Examiner* — Hemant Patel
(74) *Attorney, Agent, or Firm* — Edell, Shapiro & Finnan, LLC

(57) ABSTRACT

A bitstream encoded with video information is received at a first network enabled device from a second network enabled device. The bitstream is analyzed prior to generating an image frame corresponding to the bitstream values, and visual characteristics of the video information are determined from bitstream values in the bitstream. A modified video display is determined in response to the visual characteristics.

20 Claims, 9 Drawing Sheets

(56) References Cited

U.S. PATENT DOCUMENTS

| | | |
|---|---|---|
| 2008/0240237 A1 | 10/2008 | Tian et al. |
| 2010/0053335 A1* | 3/2010 | Hong et al. ............... 348/180 |
| 2010/0201851 A1* | 8/2010 | Bouk et al. ............... 348/252 |
| 2010/0220215 A1* | 9/2010 | Rubinstein et al. ...... 348/231.99 |
| 2012/0083314 A1* | 4/2012 | Ng et al. ................... 455/557 |
| 2013/0141518 A1 | 6/2013 | Chou |

OTHER PUBLICATIONS

Seales et al., "Active Camera Control from Compressed Image Streams", http://citeseerx.ist.psu.edu/viewdoc/download?doi=10.1.1.44.9582&rep=rep1&type=pdf, retrieved Feb. 3, 2014, 8 pages.

Marichal et al. "Blur Determination in the Compressed Domain Using DCT Information", Image Processing, 1999. ICIP 99. Proceedings. 1999 International Conference on (vol. 2 ), http://research.microsoft.com/pubs/68802/blur_determination_compressed.pdf, 5 pages.

International Search Report and Written Opinion in counterpart International Application No. PCT/US2015/020650, mailed Jul. 9, 2015, 11 pages.

* cited by examiner

ELEMENTARY VIDEO BITSTREAM ANALYSIS

TECHNICAL FIELD

The present disclosure relates to video conferencing, and in particular, the analysis and generation of video information associated with a video conference.

BACKGROUND

In a multipoint video conference, each participant contributes a video stream to the conference, and each participant receives one or more video streams that provide a view of the conference. A continuous presence video conferencing view attempts to show aspects of multiple video streams contributed to a video conference in order to give each viewing participant an experience of the conference that is more informative than that achieved by viewing a single contributed stream. Choices of which streams to view are often derived from the energy or speaking confidence measurable from associated contributed audio streams.

Where two or more streams are contributed by video conference participants, the individual streams viewed by the participants may be displayed in a number of ways, including overlapping or non-overlapping compositions, with each stream scaled to show an appropriate level of importance and/or detail. In typical applications, levels of audio activity derived from associated audio streams, and/or fixed or dynamically assigned roles assigned to the streams, are used to determine whether each stream should be displayed to video conference endpoints in a composed conference view.

The video distributed to each participant to provide a view of the conference may be encoded by a transcoding multipoint video conferencing unit ("MCU"), and delivered as a single stream showing the content of one or more contributed source streams, or switched from source by a switching MCU, which forwards one or more contributed source video streams as determined by the requirements and capability of the receiving endpoint. In either case, the MCU at the center determines what is provided to the participants of the conference as their experience of the conference.

DESCRIPTION OF EXAMPLE EMBODIMENTS

Overview

A bitstream encoded with video information is received at a first network enabled device from a second network enabled device. The bitstream is analyzed prior to generating an image frame corresponding to the bitstream values, and visual characteristics of the video information are determined from bitstream values in the bitstream. A modified video display is determined in response to the visual characteristics.

Example Embodiments

Figure 1:
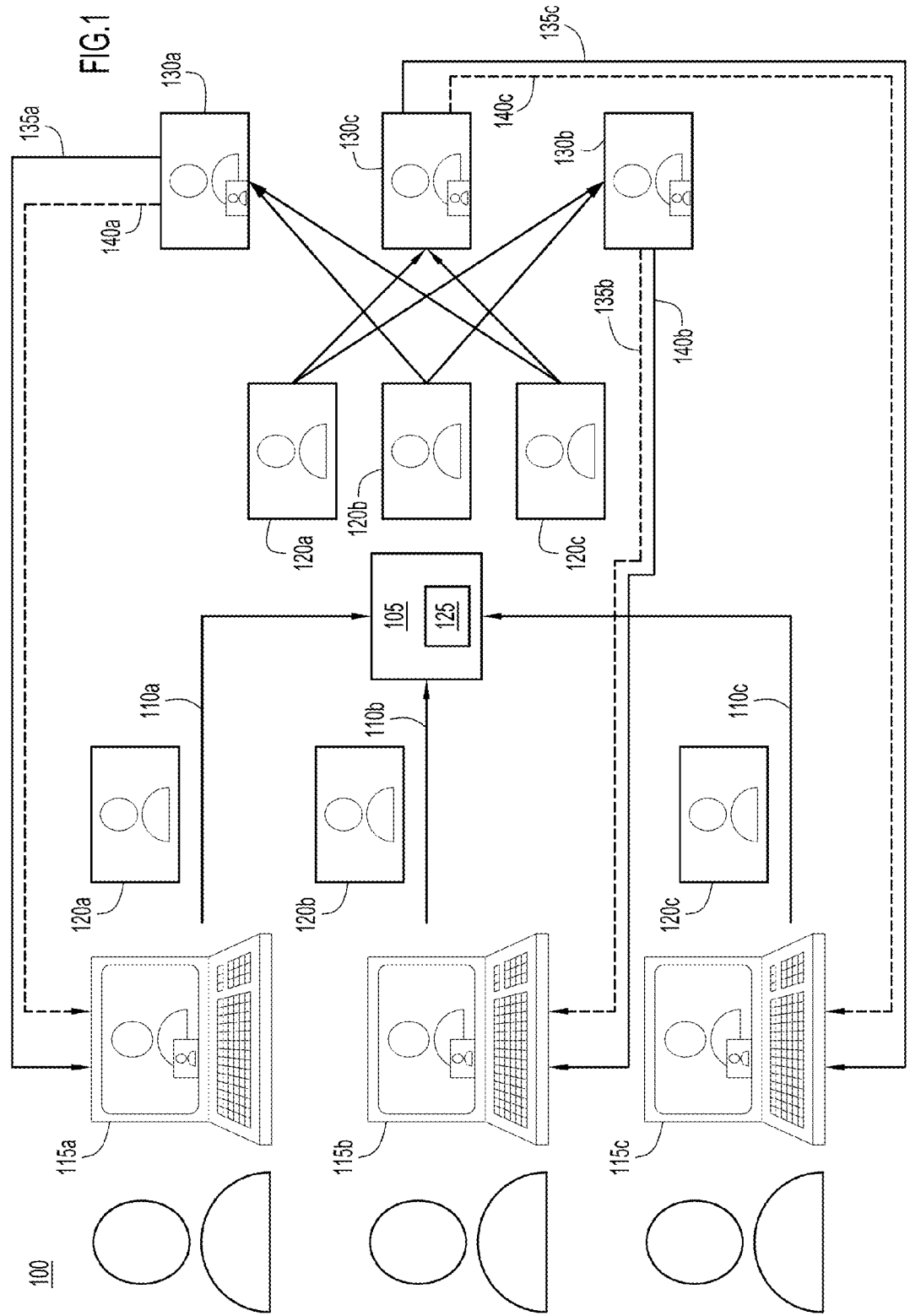
FIG. 1 is a block diagram of a system configured to provide elementary bitstream analysis of video information according to an example embodiment.

Illustrated in FIG. 1 is a multipoint video conference system in which a multipoint video conferencing unit ("MCU") 105 is configured to provide view enhancement through elementary stream analysis. Specifically, MCU 105 receives bitstreams 110a-c contributed by video conference endpoints 115a-c, respectively. Included in bitstreams 110a-c are bits encoded with video information (i.e., video images) 120a-b captured at video conference endpoints 115a-c. Upon receiving bitstreams 110a-c, MCU 105 performs elementary analysis of the streams through elementary analysis unit 125.

The analysis of the bitstreams is referred to as "elementary" in the present document because the analysis does not fully decode the streams (i.e., generate full video frames) prior to analysis. Instead, the analysis may be performed directly on the binary bitstream data, or after partial decoding, such as inspecting the motion vectors of coding units of video data (e.g., macroblocks or variable sized coding units according to the H.265/High Efficiency Video Coding (HEVC) standard). For example, elementary bitstream analysis may include modification of the decoding process to analyze or form statistics from the information in the bitstream at the level of coding units such as macroblocks. The use of these statistics may provide high-granularity information about the encoded images, such as the motion vectors of macroblocks of video data, or the average levels of those reconstructed macroblocks, which can form the basis of an image analysis. The advantages of integrating a stream analysis into the decoding process is that i) values generated during the decoding process are useful to basic image analysis and are readily available, ii) performing an analysis within the decoding process can avoid substantial overhead in computation and memory bandwidth, as would be incurred in a post-decode image analysis, iii) the process can be applied without completing the decode of the bitstream, avoiding substantial proportion of computation even within the decoding process itself, where full decode was not in fact necessary.

In response to the results of the analysis performed by elementary analysis unit 125 (specific examples of which will be described with reference to FIGS. 3-6), MCU 105 determines endpoint display video data 130a-c for each of video conference endpoints 115a-c. MCU 105 provides each participating video endpoint 115a-c with a "view" of the conference formed by a composition of the video contributed to the conference by some or all of the participating endpoints 115a-c, with the composition usually including the most relevant subset of all conference participants (and excluding the contribution of the endpoint to which this view is sent), re-encoded in a form that suits the receive capabilities of each receiving endpoint. The MCU-encoded endpoint display video data 130a-c are then transmitted to video conference endpoints 115a-c through video conference bitstreams 135a-c. If MCU 105 serves as a transcoding MCU, determined endpoint display data 130a-c would be video bitstreams generated from the contributed video participant bitstreams 110a-c. Generating the video bitstreams may comprise determining the composition (selection and positioning) of multiple decoded video streams into a single video stream for encode and transmission to conference endpoints 115a-c. If MCU 105 serves as a switching MCU, determined endpoint display video data 130a-c would be the different video streams switched to video conference endpoints 115a-c. Within the context of a switching MCU, determining the endpoint display data 130a may comprise determining the selection of the multiple streams switched to endpoints 115a-c by the MCU.

Furthermore, the video returned to endpoints 115a (or b or c) may be augmented with indications 140a-c that the conditions of the video contributed by 115a (or b or c) should be altered (speaker positioning, lighting etc.). In the case of a transcoding MCU, this indication may be added directly to the composition which is encoded in the returned bitstream.

Thus the analysis of a contributed video stream and interpretation of the scene it describes may change whether or how the contributed video stream is made visible to other endpoints in endpoint display video data distributed by the MCU, and/or give rise to feedback signals that indicate that specific characteristics of the video stream contributed by an endpoint could be improved.

Figure 2:
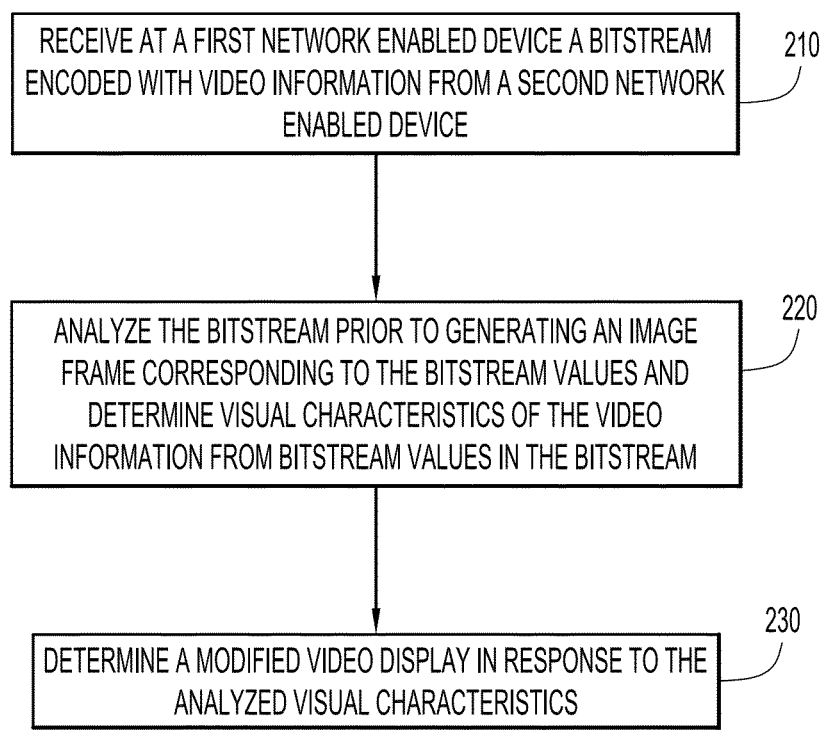
FIG. 2 is a flowchart illustrating a method of performing elementary bitstream analysis and determining a modified video display for display at a video conference endpoint in response to the analysis, according to an example embodiment.

With reference now made to FIG. 2, depicted therein is a flowchart illustrating a process that may be performed by, for example, MCU 105 and elementary analysis unit 125 of FIG. 1 in order to carry out view enhancement through elementary stream analysis. The process begins at 210 where a bitstream is received at a first network enabled device, such as MCU 105 of FIG. 1. The bitstream is received from a second network enabled device, such as one of video conference endpoints 115a-b of FIG. 1, and is encoded with video information.

At 220, visual characteristics of the video information are determined through analysis of bitstream values prior to generating an image frame corresponding to the bitstream values. In other words, elementary stream analysis is performed on the received bitstream prior to, or in some cases without, fully decoding the bitstream to form image frames. According to some examples, the binary values of the bitstream are examined in order to determine the visual characteristics of the video information. According to other examples, elements of the images described by the received bitstream are inspected. For example, elementary stream analysis may be performed as part of a complete or partial decoding of the bitstream; analysis of the fully reconstructed and complete image is not necessary. Specifically, the bitstream may be decoded to form a macroblock, and the macroblock and its properties are examined in order to determine visual characteristics of the video information.

The types of characteristics determined at 220 may include whether there is motion present in the video information, and if so, where in a video frame that motion is located. The determined characteristics may also include the luminance, chrominance and sharpness or focus of the video information. Specific examples of how these features are used are described below with reference to FIGS. 3-6. Furthermore, these characteristics and/or a combination thereof, may be used to provide an indication of key properties of the video content, such as the presence or absence of humans in the analyzed scene. These characteristics derived from instrumentation of the bitstream decoding process are assessed to determine the optimality of the contributed video content, and to adapt the way in which the video content should be used in a composed view of the video conference.

Determining the visual characteristics of the video information through elementary bitstream analysis may include averaging or "smoothing" the characteristics of the bitstream over time and over adjacent coding units. By averaging or smoothing the characteristics over time and over small image subregions, the determination of the visual characteristics can account for artifacts added to the bitstream by the video encoder and unequal treatment (e.g., differential encoding) of the video frames, and minimize transient noise-induced effects that do not correspond to underlying visual characteristics Metrics of visual characteristics of the analyzed video stream formed at the coding unit or macroblock level may be aggregated with adjacent coding units or macroblocks to form metrics at the sub-region level. An array of sub-regions that covers the entire view shown by the bitstream forms a map of each visual characteristic, and allows determination of the spatial distribution of that characteristic. For example, the determination of characteristics corresponding to human presence allows an evaluation of whether there is any human participant in the view described by the contributed video stream, and if so, whether they are well framed within that view, i.e. well-bounded by the view edges, too close or too far to the camera.

At 230, a modified video display is determined in response to the determined visual characteristics. For example, if it is determined at 220 that motion is present in the video information, the modified display may be a determination of how the moving portions of the video information should be framed so that the motion is captured in a prominent portion of the image frames that comprise a modified video stream. According to other examples, the modified video display may be a determination of a desired combination of a plurality of video streams, such as one or more of endpoint display video data 130a-c of FIG. 1, where the arrangement and/or composition of the combined stream is based on the determined chrominance, luminance and/or focus characteristics of the video information. Specifically, determined luminance information may indicate that a camera capturing the video information at a particular endpoint is covered by a lens cap or closed shutter. Accordingly, it may be determined that the video from that bitstream should be omitted from a combined video stream generated by a transcoding MCU, or not switched to an endpoint by a switching MCU. Similarly, determined chrominance and motion information may each, or together, indicate that a human user is not present in the video information of a bitstream, and the video from that bitstream should be omitted from a combined video stream. The chrominance and/or motion information may also be used to determine how to reframe or recompose the video information if it is determined that a human user is not centered in the video information.

In addition to determining the modified video display in 230, further steps may be taken to affect the distribution of video streams from an MCU according to the determined modified video display. For example, if it is determined from luminance information that a bitstream is being contributed by a camera with a closed shutter, a transcoding MCU may change the distribution of video conference display data in response to the determined modified video display by generating a modified display that omits the bitstream provided by the closed-shutter camera. A switching MCU may modify the distribution of video conference data by not switching the bitstream provided by the closed-shutter camera to other video conference participants.

According to another example of modifying the distribution of video conference information, a transcoding MCU may compose a video bitstream in response to elementary bitstream analysis. The elementary bitstream analysis may reveal that the current composition of the video conference display data distributed by an MCU superimposes content over some or all of an image of a human participant. The determined modified video display would be a new composition in which the human participant is not superimposed with other content. Accordingly, the transcoding MCU would modify the composition of the distributed display stream to a composition which does not cover the image of the human, i.e., change the distributed display to match the determined modified display. According to another example, elementary bitstream analysis may indicate that a participant's contributed video information shows a wide angle view of a large room in which many meeting participants are present. If such an image is used at a small scale, the individual participants may be rendered unrecognizable. Accordingly, elementary bitstream analysis may cause the MCU to ensure that the wide angle view is only used or distributed at a larger scale. In other words, the results of elementary stream analysis are used to modify and enhance the video distributed from the conference.

An MCU may also affect the contribution of video conference data by video conference endpoints in response to the determined video display. The analysis of stream properties contributed by a video conference participant may also allow for the determination that the participant's contribution may be improved. When it is determined that a participant's contribution can be improved, the determination made in step 230 may comprise determining remedial steps that the participant may take in order to improve its contribution; i.e., adaptation of the manner in which the video is contributed by video conference participants. Once again using the example of the bitstream provided by a camera with a closed shutter, the MCU may send an in-band or an out-of-band indication to a video conference participant intended to prompt the participant to modify its sent video by opening the camera shutter.

Said differently, an MCU may determine through elementary bitstream analysis that a participant's contribution is sub-optimal, and also determine remedial steps that the participant may take in order to optimize its contribution. In response to the determination of how a participant's contribution may be optimized, signaling or indications of the desired optimization may be returned in-band in the video (e.g., as part of the video information sent to the meeting participant by a transcoding MCU) or out-of-band via any other conference control or communication channel (for either transcoding or switching MCU). In either case, the results of elementary stream analysis generate an action to modify and enhance the video contributed to the conference.

In response to receiving the in-band or out-of band signaling, the user associated with the sub-optimal video may take steps to optimize the video. For example, if excessive motion is found through bitstream analysis, signaling information may be sent to the video conference endpoint indicating that the video capture device used by the endpoint needs to be steadied. Accordingly, the user can take remedial steps to steady his or her camera. Similarly, focus information may indicate that the video information is out of focus, so a signal may be transmitted indicating to a user that the camera capturing the video information should be focused. Accordingly, the user can take remedial steps to focus his or her camera. Elementary bitstream analysis may also indicate that a contributed video conference stream contains a human presence, but that the human presence is not well framed in the image. In response, an in-band or out-of-band indication may be returned to the participant which would guide the participant to reposition himself or herself more centrally within the camera field of view. In all of these examples, elementary bitstream inspection may be used to modify and/or improve the video conference information contributed by video conference participants.

An MCU may also leverage a control channel to directly remediate a characteristic of a contributed video conference participant video stream that is determined to be sub-optimal by the elementary stream analysis performed upon that stream. For example, a video conference participant may be using a camera equipped with a far-end camera control (FECC) system, which is configured to receive control signals to automatically align, focus, power-up, or otherwise remotely adjust the FECC equipped camera. Accordingly, the control channel may allow the decoding unit, in this case the MCU hosting a conference, to directly change the camera alignment to improve the framing of a poorly framed participant, directly alter the focus of the camera, or otherwise control the camera, thereby directly modifying the contribution of video conference information from the video conference participant.

Figure 3:
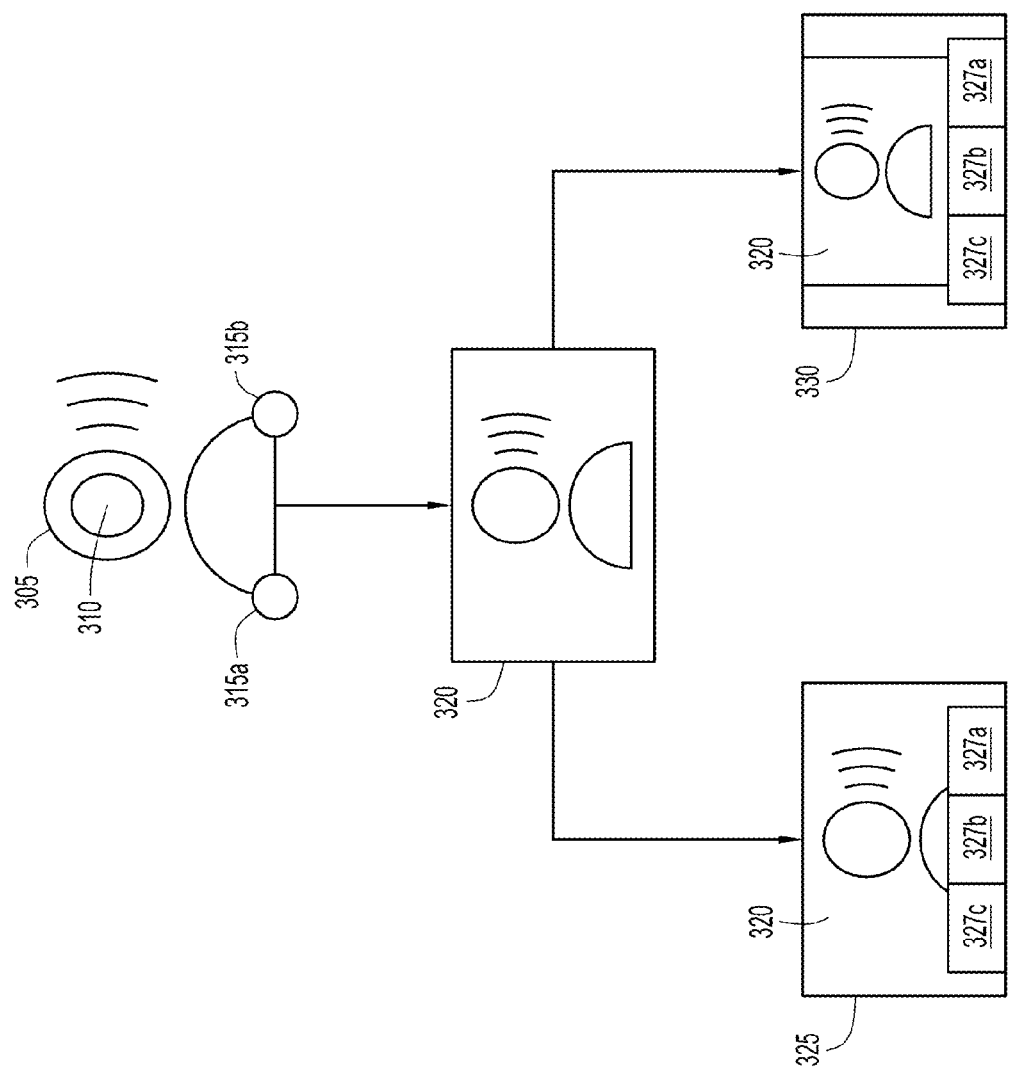
FIG. 3 is a conceptual illustration of locating motion in video information and adaptive video composition through elementary bitstream analysis, according to an example embodiment.

With reference now made to FIG. 3, depicted therein is an example of how motion information determined from elementary analysis of a video bitstream may be used to adapt the composition of a video display. In order to determine whether or not motion is present in video information of a bitstream, motion vectors can be extracted and aggregated from a bitstream. Specifically, because motion vectors are determined at the coding unit or macroblock level, the motion vectors can be determined through elementary stream analysis.

Furthermore, if motion properties are aggregated beyond the coding unit or macroblock level, within regions defined by subdivision of the coded picture in both the horizontal and vertical directions, the distribution of motion within the depicted scene can be determined, so that an edge analysis may be performed through elementary bitstream analysis. For example, if segmented motion statistics within the frame indicate that the greatest contribution of motion extends right up to one or more of the picture edges, then it is likely that the scene could be better framed by adjusting the alignment, zoom, or positioning of the camera. Thus a segmented motion statistic, or "map", can form the basis of an assessment of a) the nature of motion within the scene (noise, environment, human), b) presence or absence of humans within the field of view, c) whether the moving (and by inference, important) parts of the scene depicted in the stream are well-framed within the field of view, and how that framing could be improved, and d) which parts of the scene might be suitable for superposition of overlaid views of other conference participants.

Motion can be aggregated as a scalar or vector property within or across sub-picture zones. The formation of vector metrics for a set of sub-pictures fields can allow the separation of in-picture motion of objects within the scene from whole picture motion due to camera motion, either lateral, rotational or zoom. Correlation of sub-picture motion vectors can indicate lateral motion (panning or tilting), and anti-correlation of pairs of fields on opposite sides of the picture center can indicate camera zoom (for a room-system endpoint) or rotation (for a hand-held endpoint on a mobile device).

Elementary bitstream analysis may also be used to distinguish between motion associated with a participant and motion associated with noise and/or background or environmental features of video frames. For example, a video conference participant may be located within an environment with a flickering light. The flickering of the light off of the ceiling of the participant's environment may be read as "motion" through elementary bitstream analysis. Camera noise may also be read as "motion" through elementary bitstream analysis. Yet, this "motion" can be compensated for by considering the information density of the bitstream of the encoded video frame.

For example, video compression algorithms represent a sequence of visual images through the use of efficient frequency space representation, exploitation of spatial redundancy within a frame, and/or temporal redundancy between frames. Greater quantities of information are required to describe detail and difference. Therefore, foreground objects of interest, particularly human presence, are more likely to exhibit higher levels of detail and difference than backgrounds (which tend to be static, less detailed, and/or less in-focus). It is therefore useful to consider the spatial density of information in the received coded bitstream as a supplementary characteristic which may be indicative of the content of the encoded scene. In decoding a video bitstream, there is little additional cost in deriving a measure of information spatial density from the bits expended on each coded macroblock in the analyzed video bitstream, and using this in combination with more directly visual characteristics derived from the bitstream (motion, luminance, chrominance) in order to analyze the content of the video bitstream.

By analyzing information density, motion associated with a user may be distinguished from motion associated with a meeting participant's background or environment. For example, a flickering light may cause the frames of video associated with a video conference participant's environment, such as a ceiling of a room, to change from frame to frame. These same portions of the environment (e.g., ceilings and walls of a room) may be generally flat, featureless surfaces, and therefore lack the compensatory detail associated with a human figure. Accordingly, by evaluating motion in combination with the level of detail, i.e., information density, of portions of the video frames, meeting participants may be distinguished from noise-driven regions of motion, e.g., "motion" caused by a flickering light. Furthermore, the complexity or level of detail in the video frames may be derived from a determination of the relative expenditure of coded information in macroblocks (as well as larger spatial regions) of the coded image. Therefore, the detail information may be acquired through elementary bitstream analysis and easily used in conjunction with motion information also acquired through elementary bitstream analysis.

Additionally, aggregate motion properties can be enhanced to describe the motion of large objects, as opposed to smaller individual bodies, by the use of a motion divergence metric formed from the difference of motion associated with each macroblock and with that of neighboring macroblocks. Fields of multiple moving objects within a given zone will tend to contribute a high aggregate motion and a high divergence, whereas a single moving object will have high motion and low divergence, especially if the moving object is not completely contained in the macroblock or aggregation of macroblocks under evaluation. Thus comparison of aggregate and divergence measures, together with a threshold on aggregate motion, can be used to determine whether there is one or more coherent moving bodies within the region under evaluation.

As illustrated in FIG. 3, user 305 is a participant in a video conference at a video conference endpoint, such as endpoints 115a-c of FIG. 1. User 305 is the current active speaker in the conference, and therefore, User 305 is speaking and moving, as illustrated by moving portions 310 and 315a-b. According to this example, moving portion 310 is the head of user 305 while moving portions 315a-b correspond to the hands of user 305. Image 320 represents the video information sent from user 305 to an MCU, such as transcoding MCU 105 of FIG. 1. If the presence determination techniques described above are not utilized, the MCU receiving video information 320 may simply superimpose video information 327a-c from other users over the video information 320, as illustrated in video image 325. As can be seen in video information 325, the portions of video information 320 corresponding to moving portions 315a and b are covered by video information 327a-c in combined video information 325. As video conference presenters or users often use their hands to reinforce their points, covering moving portions 315a and b may degrade the effectiveness of the presentation of user 305.

On the other hand, by implementing the presence determination techniques described above, when video information 320 is combined with the video information from other users 327a-c, the resulting video information 330 may be composed such that moving portions 310 and 315a-b appear. Specifically, the techniques described above are capable of locating regions 310 and 315a-b in video information 320, and this knowledge is used when determining the composition of video information 330. When implemented in a transcoding MCU, the re-composition of video information 330 may be the result of an MCU generating a new video bitstream with a composition that ensures moving portions 310 and 315a-b appear.

According to other examples, if any of moving portions 310 and 315a-b are determined to be located near or at the edges of video information 320 through an edge analysis, it may be determined that the video conference participant associated with video information 320 should be reframed. Accordingly, signaling or control information may be sent to the video conference endpoint that contributes video information 320 to indicate or control the reframing of video information 320.

Figure 4:
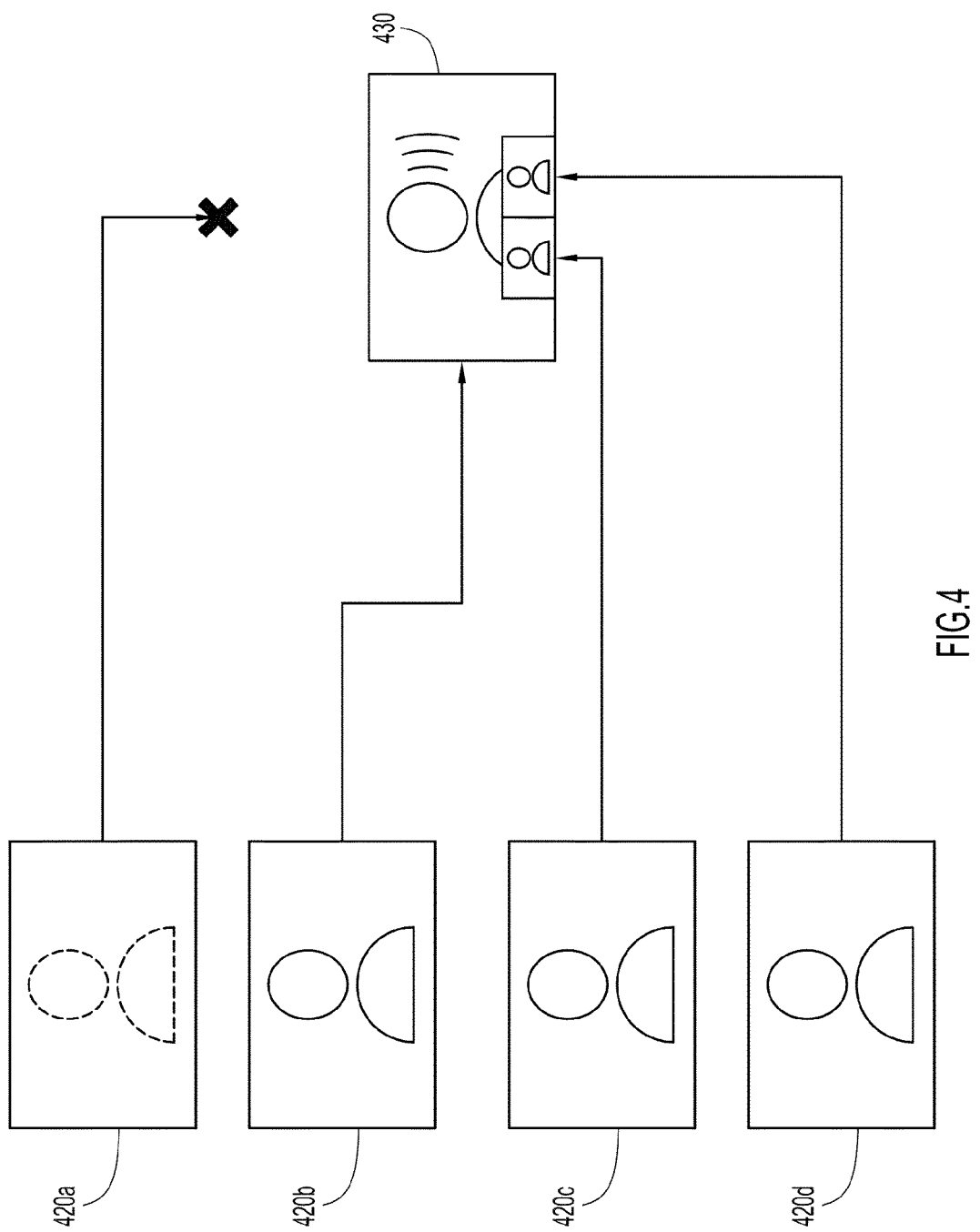
FIG. 4 is a conceptual illustration of determining focus or sharpness of video information and adaptive video composition through elementary bitstream analysis, according to an example embodiment.

Reference is now made to FIG. 4. Illustrated therein is a conceptual example of how focus information determined from elementary analysis of a video bitstream may be used to determine the composition of a modified video conference video display. Video information 420a-d represent video information sent from video conference endpoints, such as endpoints 115 a-c of FIG. 1, to an MCU, such as MCU of 105 of FIG. 1. If elementary analysis of the bitstreams associated with video information 420a-d is not performed, the MCU would combine the four streams into one combined video image, regardless of the quality or focus of the underlying video information.

On the other hand, as illustrated in FIG. 4, elementary analysis is performed on the bitstreams associated with video information 420a-d. During the elementary analysis it is determined that video information 420a is not in focus, while the remaining video information, video information 420b-d, is in focus. In response to this determination, the distribution of video information may be modified by omitting video information 420a from combined video information 430. When implemented in a transcoding MCU, the omission of video information 420a may be achieved by generating a video bitstream which lacks video information 420a. When implemented in a switching MCU, video information 420a may not be switched to video conference participants. Furthermore, in either the switching or transcoding MCU implementations, the contribution of video information may be modified by sending signaling or control information to the video conference endpoint that contributes video information 420 to indicate or control the refocusing of video information 420. The signaling or control information may be sent in addition or as an alternative to the omission of video information 420a illustrated in FIG. 4. In fact, in some implementations, the use of signaling or control information to correct or improve video information 420a may be preferred over omitting video information 420a from the combined or switched video information.

When determining if video information, such as video information 420a, is in focus, residual coefficient information from the frequency domain of the coded bitstream may be utilized. For example, an indication of poor focus in video information may be that no part of the video information contributes to high frequencies in a bitstream that includes low to mid quantization parameter values. By analyzing the distribution of the residual coefficients, poor focus video information can be identified. If such a bitstream is detected during elementary analysis, it may be determined that the video information encoded in the stream is out of focus, and therefore, the video information should be omitted from a combined video image.

Figure 5:
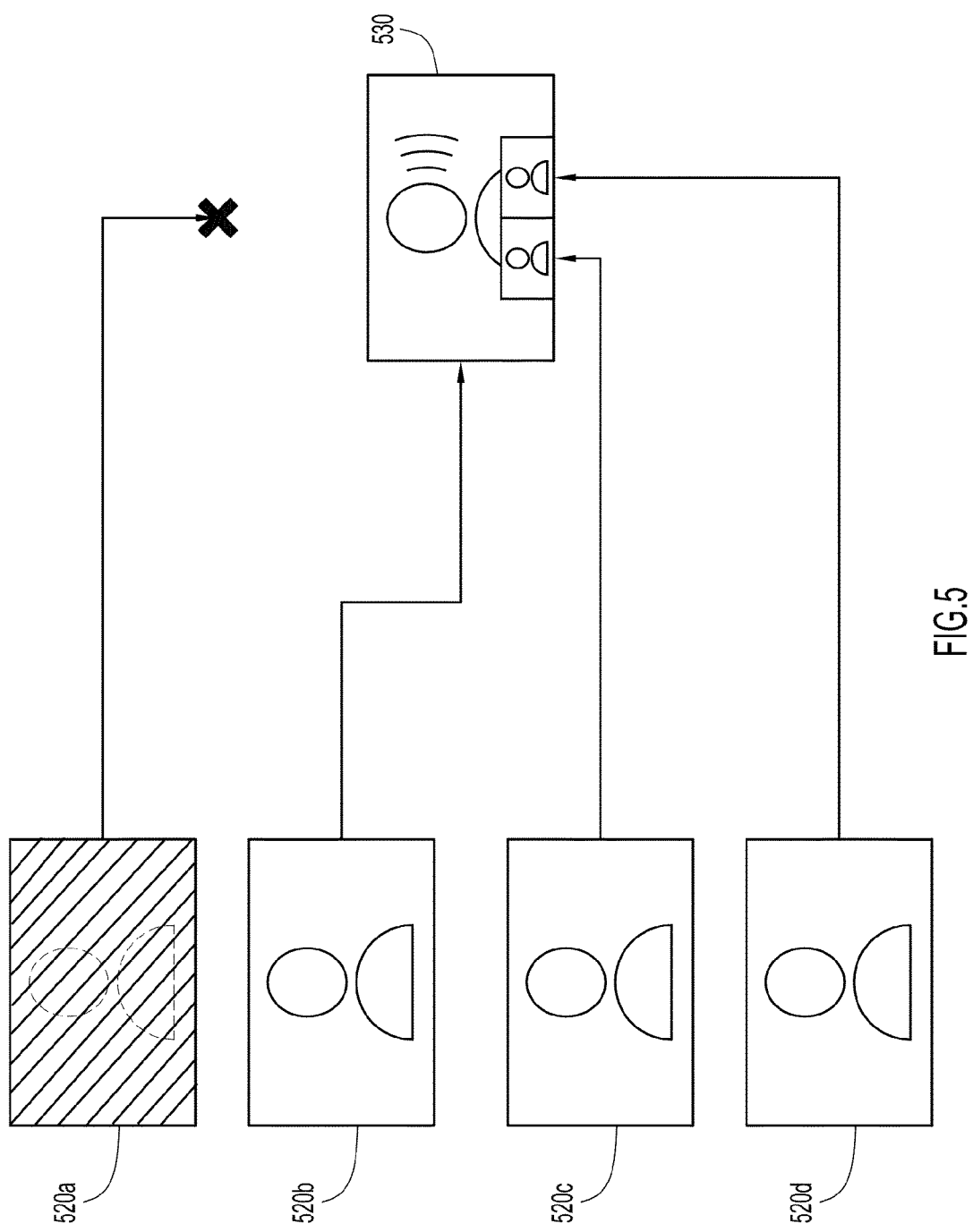
FIG. 5 is a conceptual illustration of determining lighting level in video information and adaptive video composition through elementary bitstream analysis, according to an example embodiment.

With reference now made to FIG. 5, illustrated therein is a conceptual example of how luminance information determined from elementary analysis of a video bitstream may be used to compose a modified video conference video display. Video information 520a-d represents video information sent from video conference endpoints, such as endpoints 115 a-c of FIG. 1, to an MCU, such as MCU of 105 of FIG. 1. If elementary analysis of the bitstreams associated with video information 520a-d is not performed, the MCU might combine the four streams into one combined video image, regardless of the brightness and/or contrast of the underlying video information.

On the other hand, as illustrated in FIG. 5, elementary analysis is performed on the bitstreams associated with video information 520a-d. During the elementary analysis it is determined that video information 520a is encoded with information for an extremely low-light environment, while the remaining video information, video information 520b-d, contain information for environments with sufficient lighting. In response to this determination, the distribution of video information may be modified by omitting video information 520a from combined video information 530. When implemented in a transcoding MCU, the omission of video information 520a may be achieved by generating a video bitstream which lacks video information 520a. When implemented in a switching MCU, video information 520a may not be switched to video conference participants. Furthermore, the contribution of video information may be modified by sending signaling or control information to the video conference endpoint that contributes video information 520 to indicate or control the luminance of video information 520. Though, if a determination is made that a camera shutter is closed or a lens cap is on, exclusion of video information 520 from distribution may be favored as the user has likely purposefully closed their shutter or left their lens cap on.

In order to determine the lighting level, the elementary bitstream analysis may analyze the luminance of a luminance-chrominance ("YbCbCr") digital video signal integrated into the bitstream decoding process rather than performing a separate image analysis. The elementary analysis of luminance information may also be used in combination with other elementary analysis techniques, such as the motion techniques described above in reference to FIG. 3. For example, even the lighting of a bright image can be sub-optimal, such as when a participant is back lit due to the light source being behind the participant. By combining motion analysis to determine the location of the participant with luminance values and/or contrast of luminance values, a backlit participant can be identified. Once it is determined that the participant is backlit, optical filtering techniques may be applied to the video information, or signaling may be sent back to the participant to correct the back lighting, as described in reference to FIGS. 7 and 8.

According to other examples, the results of the elementary bitstream analysis may be combined with other information received from video conference participants. For example, in FIG. 5, the luminance levels associated with video information 520a may indicate that a camera shutter is closed, while the audio stream associated with video information 520a indicates that the participant associated with video information 520a is attempting to contribute to the video conference. Specifically, if there is audio contributed from that endpoint associated with video information 520a, it is likely that the participant should be seen as well as heard. Accordingly, a visual or audio indication that the shutter is closed can be shown or amplified at the source endpoint in order to prompt the contributing participant to open the shutter and show themselves to the participants to whom he or she is speaking.

Figure 6:
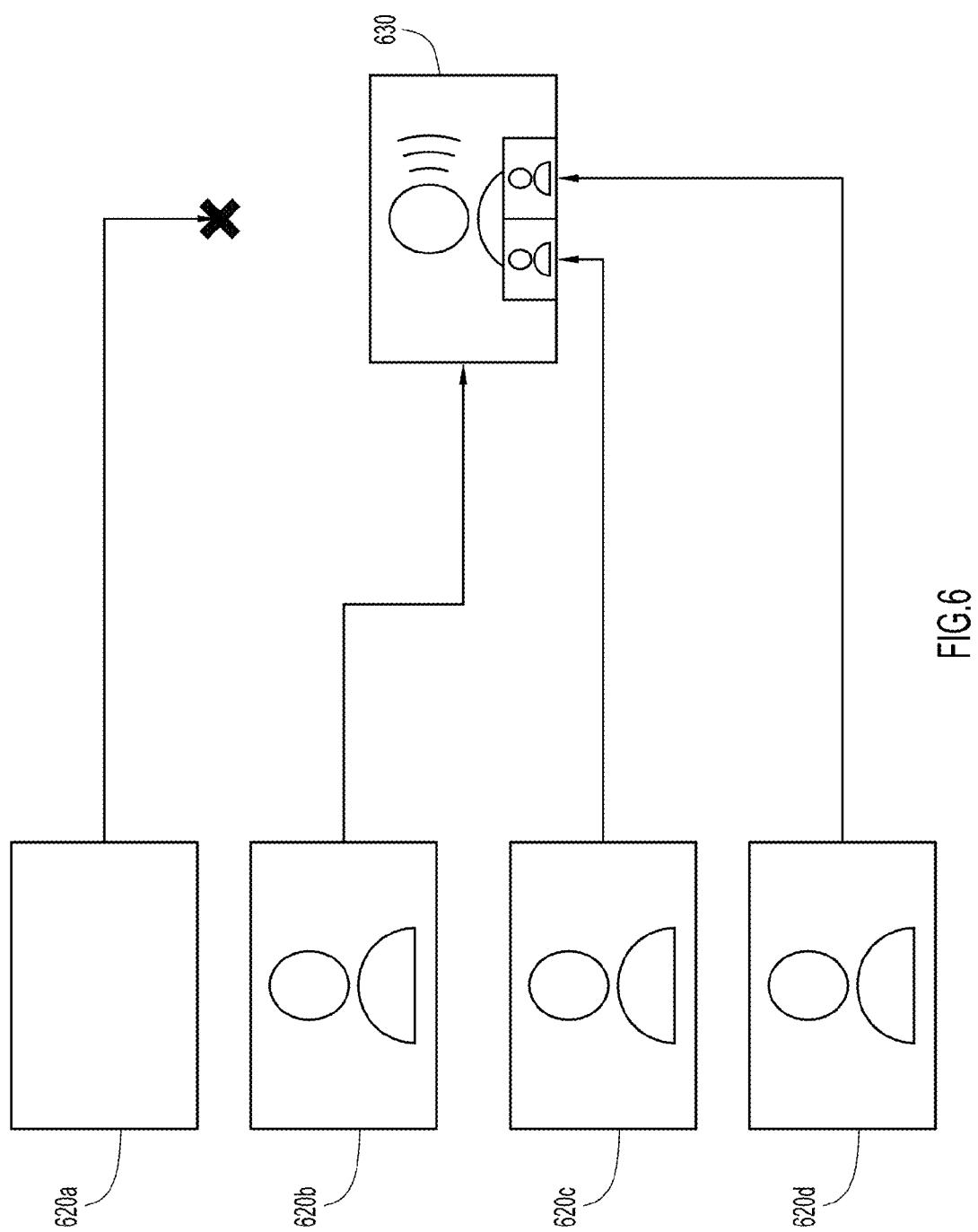
FIG. 6 is a conceptual illustration of locating human presence in video information and adaptive video composition through elementary bitstream analysis, according to an example embodiment.

Similar to the discussion above with reference to FIG. 5, FIG. 6 illustrates a conceptual example of how chrominance information determined from elementary analysis of a compressed bitstream derived from the encoding of a video sequence presented in the YCbCr color space may be used to compose a modified video conference video display. The chrominance values of a bitstream encoded with video data can be generally associated with human skin tones in a widely applicable way. For example, human skin tones will generally fall within a range of chrominance values which cross racial and ethnic lines. Accordingly, an elementary analysis of chrominance values in a bitstream may be used to determine whether or not a participant is actually present within the video information included in a bitstream. The use of chrominance to indicate presence is strengthened when criteria are applied on spatial extent, and associated with other characteristics, such as motion.

As illustrated in FIG. 6, elementary analysis of chrominance values is performed at an MCU, such as MCU 105 of FIG. 1, on each of the bitstreams associated with video information 620a-d. In response to the elementary analysis, it is determined from the chrominance levels that video information 620a does not include a participant, while video information 620b-d does contain participants. Accordingly, when the MCU combines video information 620a-d to form endpoint display video data 630, the video data from video information 620a is omitted from endpoint display video data 630. When implemented in a transcoding MCU, the omission of video information 620*a* may be achieved by generating a video bitstream which lacks video information 620*a*. When implemented in a switching MCU, video information 620*a* may not be switched to video conference participants. Similar to the other examples, the contribution of video information may be modified by sending signaling or control information to the video conference endpoint that contributes video information 620. Though when chrominance analysis indicates no user is present in video information 620, excluding video information 620 from distribution may be the favored technique as the user may be aware that they are not being captured in video information 620.

Chrominance information may also be combined with other elementary analysis information to more accurately determine whether or not a user is present in a video information 620*a-d*. For example, not only does chrominance information fall into a specific range for human participants, but human participants will often move during a video conference. Accordingly, macroblocks of data which exhibit the correct chrominance values for a human participant while simultaneously exhibiting a motion vector may be strongly suggestive of the macroblock containing human participant information. When such a macroblock is identified, an MCU may be configured to include the video information associated with the macroblock in endpoint display video data, such as endpoint display video data 630.

Figure 7:
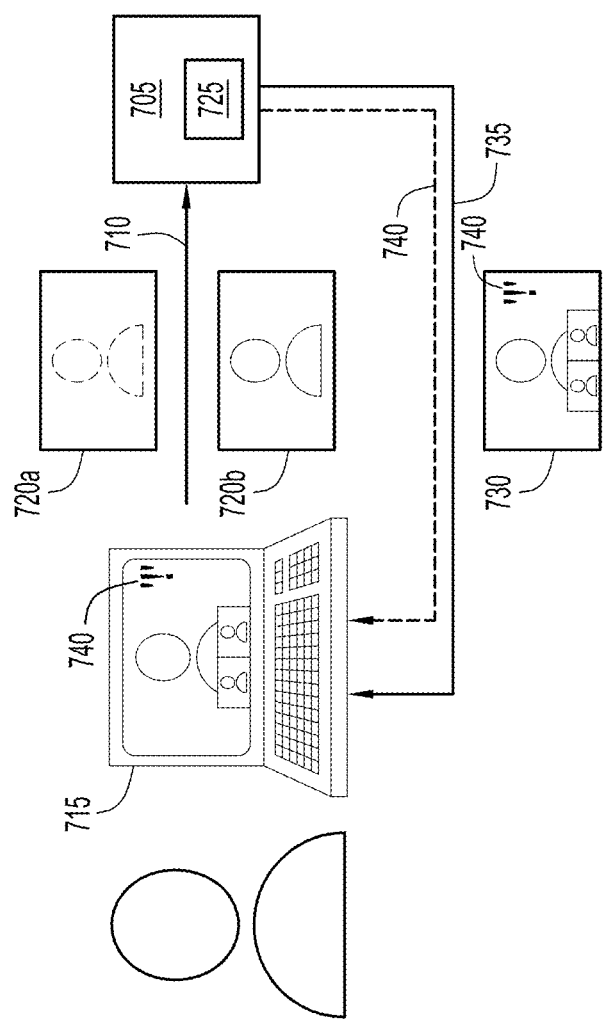
FIG. 7 is a conceptual illustration of providing in-band signaling of control signals determined in response to elementary bitstream analysis, according to an example embodiment.

With reference now made to FIG. 7, depicted therein is the usage of elementary stream analysis combined with in-band signaling by a transcoding MCU through direct modification of the video returned to participant 715. The in-band signaling indicates the necessary adjustment of one or more qualities of the video information contributed by that video conference participant. As used herein, "in-band" refers to information sent directly in the video bitstream sent to video conference participants. Specifically, video conference participant 715 sends video information 720*a* to MCU 705 via bitstream 710. Elementary analysis is performed on bitstream 710 through elementary analysis unit 725. Bitstream analysis unit 725 may determine that video information 720*a* contains excess motion, and MCU 705 indicates that to participant 715 by the addition of a graphical or text signaling 740 of that excessive motion in video conference bitstream 735.

For example, when video conferences are joined from a video conferencing client on a handheld or mobile device with an inbuilt or affixed camera, motion of the device will lead to high degrees of motion in the scene shown to other conference participants. This high degree of motion can degrade the performance of video compression and can also degrade the experience of others viewing the conference participant. The participant contributing this motion can be informed of the excessive camera motion through an icon on the screen, encouraging them to mount the mobile endpoint more stably. Accordingly, when MCU 705 determines and causes the transmission of endpoint display video data 730 over video conference bitstream 735, MCU 705 also includes in-band signaling 740. According to the present example, where it has been determined that video information 720*a* contained excess motion, the signaling 740 may include a message to be displayed to participant 715 indicating that its camera is being moved excessively and is causing degraded video information to be sent to MCU 705. Similarly, if bitstream analysis unit 725 determines that video information 720*a* included a low-light or backlit image, signaling 740 may cause a message to be displayed to participant 715 that he or she needs to adjust the illumination at his or her location. According to other examples, signaling information 740 may indicate to user 715 that his or her lens cap is on, an image is out of focus, or that participant 715 is not within the frame of video information 720*a*.

Upon receiving signaling 740, participant 715 may take corrective action which results in corrected video information 720*b* to be sent to MCU 705 over bitstream 710. For example, participant 715 may stabilize his or her camera, move to a more central position, adjust his or her lighting, open his or her camera shutter, focus his or her camera, or take other corrective action indicated through signaling information 740.

Figure 8:
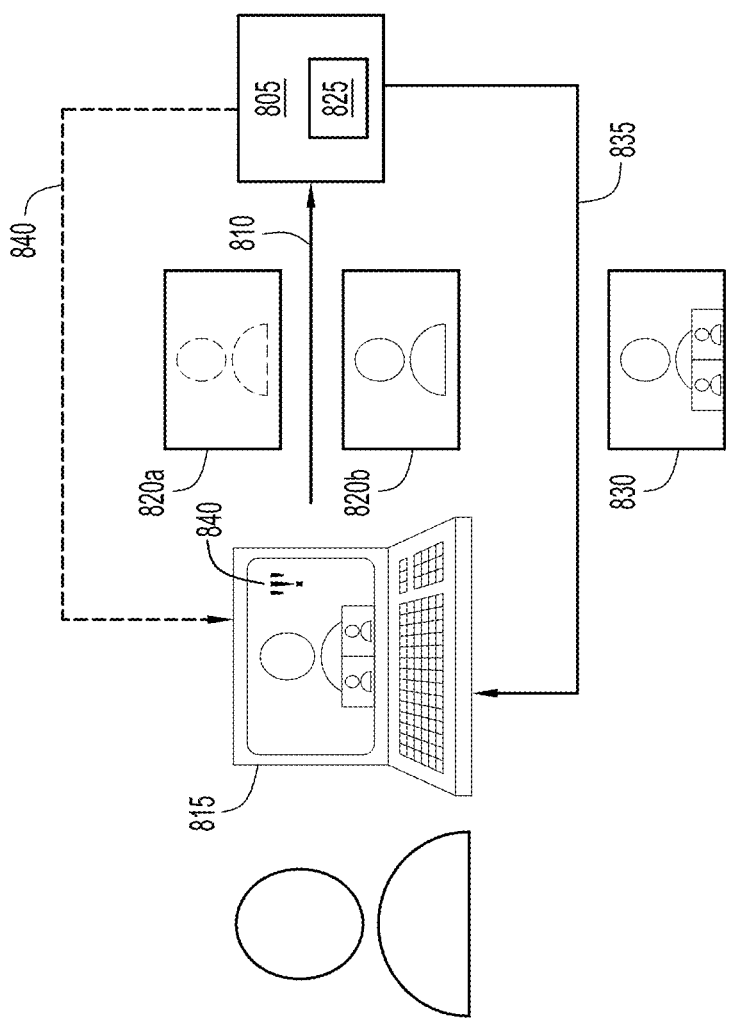
FIG. 8 is a conceptual illustration of providing out-of-band signaling of control signals determined in response to elementary bitstream analysis, according to an example embodiment.

With reference now made to FIG. 8, depicted therein is the usage of elementary stream analysis combined with out-of-band signaling which allows for the control or correction of the video information sent by a video conference participant. As used herein, "out-of-band signaling" refers to signals not embedded in the video bitstream sent to meeting participants.

As depicted in FIG. 8, video conference participant 815 sends video information 820*a* to MCU 805 via bitstream 810. Elementary analysis is performed on bitstream 810 through elementary analysis unit 825. Bitstream analysis unit 825 may determine that video information 820*a* contains poor illumination. In addition to determining video conference bitstream 835 containing video conference video information 830, MCU 805 may also generate out-of-band signaling 840. Out-of-band signaling, as used herein, refers to signaling that takes place over a channel other than the channel used to send video information from an MCU to a video conference participant. The signaling returned to the source of analyzed video with a suboptimal characteristic may express the suboptimality to the human participant at the source endpoint as a text or graphical indication displayed on a suitable interface, directing them to correct the suboptimality. Or the signaling may directly interact with a mechanism that can correct the suboptimality without human participation.

For example, an environmental control system in charge of the lighting at the location of participant 815 may be controlled by an application separate from the application used by participant 815 to join the video conference. Accordingly, MCU 805 may send out-of-band signaling 840 over the system employed by the environmental control system as opposed to the video conference bitstream 835.

According to other examples, signaling information 840 may include control signals that directly control the camera or environment of participant 815. For example, if the focus of the camera of participant 815 can be electronically controlled, signaling information 840 may include signals that adjust the focus of the camera without any intervention from participant 815. Similarly, if MCU 805 determines that video information 820*a* is being sent at a higher or lower quality than the other participants in a video conference, signaling information 840 may control the camera and video conferencing software of participant 815 such that when corrected video information 820*b* is sent to MCU 805, the quality of corrected video information 820*b* may match that of the other video conference participants, or will be improved over the previously provided video information.

Other examples of out-of-band signaling may include sending signaling messages 840 as a Short Message Service ("SMS") message, as an email, as an instant messaging protocol message, or some other form of communication that is not included in video bitstream 835.

Figure 9:
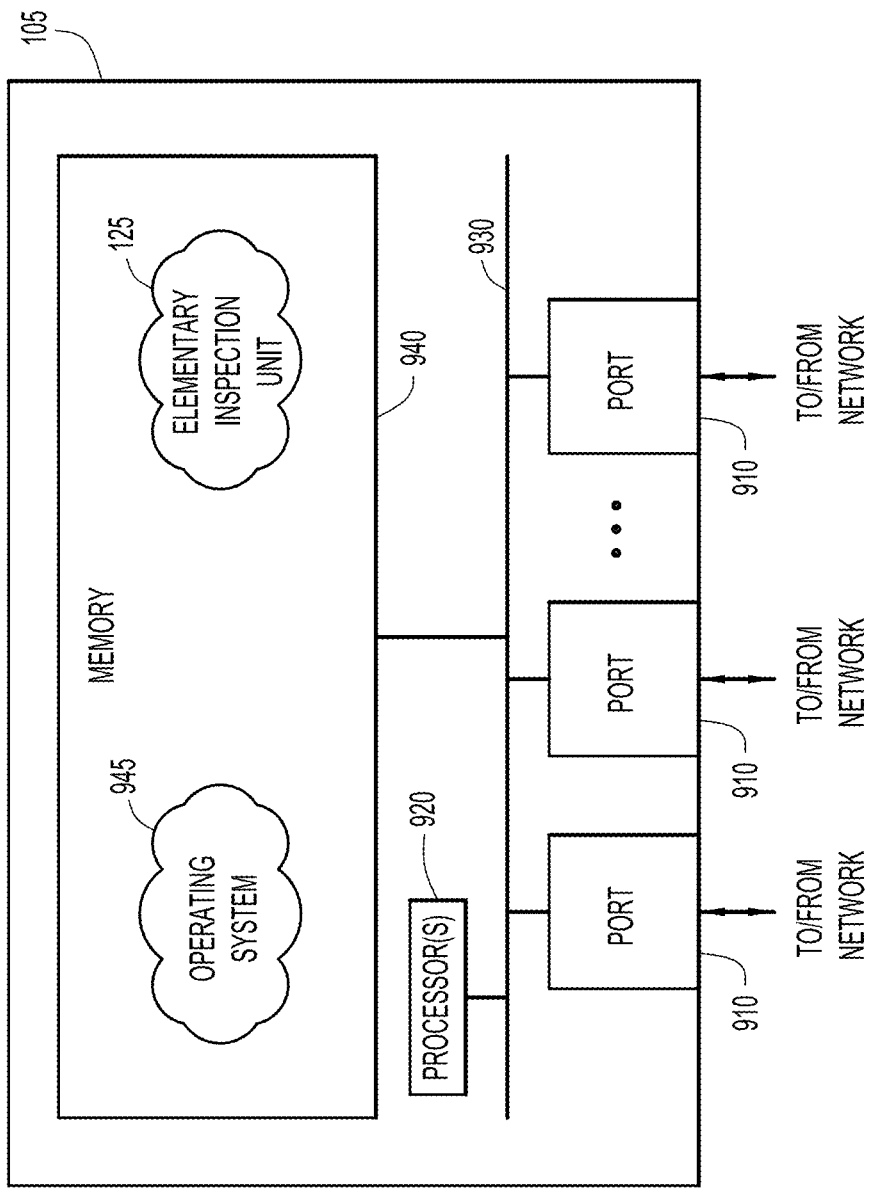
FIG. 9 is a block diagram of a network enabled device configured to perform elementary bitstream analysis, according to an example embodiment.

Turning now to FIG. 9, depicted therein is an example block diagram of a network device 105, e.g., MCU 105 of FIG. 1, configured to perform the techniques described herein in connection with FIGS. 1-8. The MCU 105 comprises one or more ports 910 to enable communication over a network, processor(s) 920, bus 930, and memory 940. The memory 940 contains software instructions for operating system 945 and elementary analysis unit 125.

Memory 940 may comprise read only memory (ROM), random access memory (RAM), magnetic disk storage media devices, optical storage media devices, flash memory devices, electrical, optical, or other physical/tangible (e.g., non-transitory) memory storage devices. The processor 920 is, for example, a microprocessor or microcontroller that executes instructions for MCU 105. Thus, in general, the memory 940 may comprise one or more tangible (non-transitory) computer readable storage media (e.g., a memory device) encoded with software comprising computer executable instructions and when the software is executed (by the processor 920), and in particular the instructions for the elementary analysis unit 125, it is operable to perform the operations described herein in connection with FIGS. 1-8. Specifically, elementary analysis unit 125 includes instructions that allow processor 920 to provide elementary bitstream analysis as described herein.

By implementing the techniques described herein, a device such as MCU 105 of FIG. 9 may be configured to provide: i) lightweight formation of stream metrics during bitstream decode (or partial decode), ii) spatially segmented maps of such metrics for elementary scene content analysis, for the purpose of iii) optimal use of the contributed video in a multipoint conference, and iv) generation of feedback to improve the contributed content within such streams, in order to maximize the experience of others viewing those streams. The metrics and properties of the contributed compressed video that can be extracted through elementary bitstream analysis include: motion and its distribution (indicating occupancy, framing and camera stability); chrominance levels (indicating human presence); luminance levels (indicating lighting quality and shutter usage); quantization (indicating quality); presence of high-frequencies indicating sharpness (focus); and spatial information density, as an auxiliary characteristic correlated with foreground activity.

Furthermore, an MCU such as MCU 105 of FIG. 9 can provide the following advantages to a video conferencing system. Specifically, the video conference video provided to users may be optimized by a) selection of the way in which each stream is combined (or not combined) with others, or selection or exclusion of each stream for forwarding to receiving endpoints, b) signaling to the participant at the video source that the view of them is suboptimal and should be adjusted, and, where suitable control means exist, c) attempting to adjust that view remotely.

Additionally, by forming image statistics based on values extracted through elementary bitstream analysis, the statistics can be acquired with very little additional computational cost, substantially saving on computation and memory bandwidth that would be required for a separate image analysis process. Also, when used at a sub-picture level in a coarse-granularity array, interpretations of scene content can be formed in a very simple way, indicating for example participant placement, again with very low computation cost compared to specific feature extraction. Further, when applied as a modification of the decoding process of a received stream, the analysis of scene content can be used to provide feedback to the user at source endpoints to optimize the content in a specific way, by improving camera alignment or focus, or moderating participant positioning, motion or lighting. The same techniques can be applied in the encoding process for a contributed stream, for immediate feedback to the local participant in the same way.

Where multiple streams are contributed to a conference from which to compose, encode and transmit a view of the conference to other participants, the segmented properties of the streams can be used to determine appropriate compositions of the contributed streams to provide an improved conference view, on the basis of the distribution of regions of interest within the coded stream, or on the contributed video quality. Where streams are selected for display (either individually or as part of a multi-stream composition) the use of video metrics can avoid the use of streams that are not visually suitable (poor quality or lighting, closed shutter, wrong camera segment, etc.) that would otherwise be displayed on the basis of contributed audio. Improvements in stream selection and composition choice will improve the conference experience for all viewers of a multiparty conference.

Finally, the techniques of analysis, feedback and modification of conference views can also be applied in switched video conferencing, at the cost of a partial decode of contributed streams, to the extent that syntactic values such as motion vectors are reconstructed, and luminance and chrominance values are determined. This enhances a switching MCU to interact with the content of the video streams it receives and forwards, in order to enable the aims of improved quality of contributed streams and selection of the most appropriate streams for distribution. An example of this would be the use of motion and presence indications with a contributed stream to supplement and validate the selection of streams which may otherwise be based solely on associated audio, such that acoustic masking effects are prevented from leading to a view of an empty room being shown in preference over a stream which does in fact show participants as present. Other aforementioned determinations of lighting, framing, focus, camera shutter state, or camera motion can similarly be made from an analyzed stream that is at least partially decoded, even if the stream itself is to be forwarded, rather than used in a local composition to be re-encoded. Distribution decisions may be based on the characteristics of contributed video streams, and contribution characteristics may be modified in response to out-of-band signaling returned to the video source endpoint.

To summarize, a method is provided comprising: receiving at a first network enabled device a bitstream encoded with video information from a second network enabled device; analyzing the bitstream prior to generating an image frame corresponding to the bitstream values and determining visual characteristics of the video information from bitstream values in the bitstream; and determining a modified video display for display at one or more network enabled devices in response to the visual characteristics.

Similarly, an apparatus is provided comprising: at least one network interface unit configured to enable network communications; and a processor coupled to the network interface unit, wherein the processor is configured to: receive a bitstream encoded with video information from a network enabled device; analyze the bitstream prior to generating an image frame corresponding to the bitstream values and determine visual characteristics of the video information from bitstream values in the bitstream; and determine a modified video display for display at one or more network enabled devices in response to the visual characteristics.

Further still, a tangible, non-transitory computer readable medium is provided comprising instructions that when executed by a processor cause the processor to: obtain a received bitstream encoded with video information from a network enabled device; analyze the bitstream prior to generating an image frame corresponding to the bitstream values and determine visual characteristics of the video information from bitstream values in the bitstream; and determine a modified video display at one or more network enabled devices in response to the visual characteristics.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
    receiving at a first network enabled device an encoded bitstream encoded with video information from a second network enabled device;
    analyzing video image data in the bitstream prior to or during the decoding of the bitstream and prior to generating an image frame corresponding to the bitstream values, and determining visual characteristics of the video information from bitstream values in the bitstream; and
    determining a modified video display for display at one or more network enabled devices in response to the visual characteristics.

2. The method of claim 1, wherein determining the modified video display comprises:
    generating a modified video display stream according to the determined visual characteristics; and
    transmitting the modified video display stream.

3. The method of claim 1, wherein determining the modified video display comprises:
    determining a method of optimizing the video information received from the second network enabled device; and
    providing signaling to the second network enabled device configured to optimize video information sent from the second network enabled device in response to the determined visual characteristics.

4. The method of claim 1, wherein determining the modified video display comprises selecting a display video stream to be switched to a video conference participant.

5. The method of claim 1, wherein analyzing the bitstream comprises analyzing visual characteristics from at least one coding unit derived from the bitstream.

6. The method of claim 5, wherein analyzing visual characteristics from at least one coding unit comprises:
    combining the at least one coding unit with at least one other coding unit to form a combined unit;
    performing an edge analysis on the combined unit; and
    determining that a video stream should be re-framed in response to the edge analysis.

7. The method of claim 1, wherein determining the visual characteristics comprises locating areas of motion within the video stream.

8. The method of claim 1, wherein determining the visual characteristics comprises analyzing a chrominance value from the bitstream, and determining a presence of a user based on the chrominance value.

9. The method of claim 1, wherein determining the visual characteristics comprises analyzing a luminance value from the bitstream, and determining a light level of a location of the first network enabled device based upon the luminance value.

10. The method of claim 1, wherein determining the visual characteristics comprises analyzing a coefficient distribution from the bitstream, and determining a focus level of the video data corresponding to the bitstream values based upon the coefficient distribution.

11. The method of claim 1, wherein determining the visual characteristics comprises analyzing spatial density of information in the bitstream and determining portions of the bitstream which exhibit relatively higher levels of detail.

12. An apparatus comprising:
    at least one network interface unit configured to enable network communications; and
    a processor coupled to the network interface unit, wherein the processor is configured to:
    receive an encoded bitstream encoded with video information from a network enabled device;
    analyze the bitstream prior to or during the decoding of the bitstream and prior to generating an image frame corresponding to the bitstream values, and determine visual characteristics of the video information from bitstream values in the bitstream; and
    determine a modified video display for display at one or more network enabled devices in response to the visual characteristics.

13. The apparatus of claim 12, wherein the processor is further configured to:
    generate a modified video display stream according to the analyzed visual characteristics; and
    cause the modified video display stream to be transmitted.

14. The apparatus of claim 12, wherein the processor is further configured to:
    determine a method of optimizing the video information received from the network enabled device; and
    provide signaling to the network enabled device configured to optimize video information sent from the network enabled device in response to the analyzed visual characteristics.

15. The apparatus of claim 12, wherein the processor is further configured to select a display video stream to be switched to a video conference participant.

16. The apparatus of claim 12, wherein the processor is further configured to analyze at least one of a chrominance value, a luminance value, or spatial density of information in the bitstream.

17. A tangible, non-transitory computer readable medium comprising instructions that when executed by a processor cause the processor to:
    obtain a received encoded bitstream encoded with video information from a network enabled device;
    analyze the bitstream prior to or during the decoding of the bitstream and prior to generating an image frame corresponding to the bitstream values, and determine visual characteristics of the video information from bitstream values in the bitstream; and
    determine a modified video display at one or more network enabled devices in response to the visual characteristics.

18. The computer readable medium of claim 17, wherein the instructions further cause the processor to:
    generate a modified video display stream according to the determined visual characteristics; and
    cause the modified video display stream to be transmitted.

19. The computer readable medium of claim 17, wherein the instructions further cause the processor to:
    determine a method of optimizing the video information received from the second network enabled device; and
    provide signaling to the network enabled device configured to optimize video information sent from the network enabled device in response to the determined visual characteristics.

20. The computer readable medium of claim 17, wherein the instructions further cause the processor to select a display video stream to be switched to a video conference participant.

* * * * *